US008875441B2

(12) United States Patent
Agam et al.

(10) Patent No.: US 8,875,441 B2
(45) Date of Patent: Nov. 4, 2014

(54) ADAPTIVE ULTRASOUND DETECTING SYSTEM FOR A DOOR ASSEMBLY

(71) Applicant: Sensotech Inc., Montreal (CA)

(72) Inventors: Uri Agam, Quebec (CA); Pino Marcovecchio, Quebec (CA)

(73) Assignee: Sensotech Inc., Montreal, Quebec (CA)

( * ) Notice: Subject to any disclaimer, the term of this patent is extended or adjusted under 35 U.S.C. 154(b) by 0 days.

(21) Appl. No.: 13/907,514

(22) Filed: May 31, 2013

(65) Prior Publication Data

US 2013/0263511 A1    Oct. 10, 2013

Related U.S. Application Data

(63) Continuation of application No. PCT/CA2011/001337, filed on Dec. 1, 2011.

(60) Provisional application No. 61/419,436, filed on Dec. 3, 2010.

(51) Int. Cl.
*E05F 15/20* (2006.01)
*G01S 15/04* (2006.01)
*G01S 7/527* (2006.01)

(52) U.S. Cl.
CPC .............. *E05F 15/2023* (2013.01); *G01S 15/04* (2013.01); *G01S 7/527* (2013.01); *E05Y 2900/132* (2013.01)
USPC ................................................. 49/28; 49/26

(58) Field of Classification Search
USPC ........ 49/26–28, 116, 118, 366; 318/264–266, 318/272, 275, 277, 282, 286, 466–469, 626
See application file for complete search history.

(56) References Cited

U.S. PATENT DOCUMENTS

| 3,852,592 | A | * | 12/1974 | Scoville et al. | ............... 250/221 |
| 4,029,176 | A | * | 6/1977 | Mills | ............................. 187/317 |
| 4,577,437 | A | * | 3/1986 | Gionet et al. | ..................... 49/25 |
| 4,697,383 | A | * | 10/1987 | Hagiwara | ......................... 49/25 |
| 4,733,081 | A | * | 3/1988 | Mizukami | .................. 250/341.8 |
| 4,779,240 | A | * | 10/1988 | Dorr | ............................ 367/96 |
| 4,823,010 | A | * | 4/1989 | Kornbrekke et al. | ...... 250/341.7 |
| 4,866,881 | A | * | 9/1989 | Morrow et al. | .................. 49/25 |

(Continued)

FOREIGN PATENT DOCUMENTS

WO    WO2009/105876    9/2009

OTHER PUBLICATIONS

International Search Report and and Written Opinion issued for corresponding International Patent Application PCT/CA2011/001337 mailed Mar. 6, 2012.

*Primary Examiner* — Katherine Mitchell
*Assistant Examiner* — Justin Rephann
(74) *Attorney, Agent, or Firm* — Myers Wolin, LLC (57) ABSTRACT

Embodiments of an adaptive ultrasound detecting system for a door assembly include an ultrasound transducer assembly mounted to the door assembly and a controller coupled to the ultrasound transducer assembly. The ultrasound transducer assembly is adapted to emit ultrasound detecting beams within the door path, and to trigger a detecting signal indicative of a body located within the door path when the body intersects at least one of the ultrasound detecting beams. The controller is adapted to receive information indicative of a position of the door along the path, and to vary emitting at least one detecting beam in accordance to the position of the door relative to the ultrasound detecting beams.

18 Claims, 11 Drawing Sheets

(56) References Cited

U.S. PATENT DOCUMENTS

| | | | |
|---|---|---|---|
| 4,893,852 A * | 1/1990 | Harris et al. | 292/251.5 |
| 4,914,859 A * | 4/1990 | Gionet et al. | 49/25 |
| 4,967,083 A * | 10/1990 | Kornbrekke et al. | 250/341.7 |
| RE33,668 E * | 8/1991 | Gray | 250/221 |
| 5,142,152 A * | 8/1992 | Boiucaner | 250/341.7 |
| 5,149,921 A * | 9/1992 | Picado | 187/317 |
| 5,276,391 A * | 1/1994 | Jonsson | 318/480 |
| 5,410,149 A * | 4/1995 | Winston et al. | 250/221 |
| 5,420,430 A * | 5/1995 | Trett | 250/341.1 |
| 5,886,307 A * | 3/1999 | Full et al. | 187/317 |
| 5,925,858 A * | 7/1999 | Full et al. | 187/317 |
| 5,963,000 A * | 10/1999 | Tsutsumi et al. | 318/480 |
| 5,996,281 A * | 12/1999 | Takano et al. | 49/26 |
| 6,051,829 A * | 4/2000 | Full | 250/221 |
| 6,167,991 B1 * | 1/2001 | Full et al. | 187/317 |
| 6,304,178 B1 * | 10/2001 | Hayashida | 340/545.1 |
| 6,329,774 B1 * | 12/2001 | Ariav | 318/282 |
| 6,341,563 B1 * | 1/2002 | Gal et al. | 104/28 |
| 6,344,642 B1 * | 2/2002 | Agam et al. | 250/221 |
| 6,386,326 B2 * | 5/2002 | Pustelniak et al. | 187/317 |
| 6,678,999 B2 * | 1/2004 | Zengguang et al. | 49/25 |
| 6,782,660 B2 * | 8/2004 | Takada et al. | 49/25 |
| 6,970,085 B2 * | 11/2005 | Okabe et al. | 340/545.6 |
| 7,130,244 B2 * | 10/2006 | Gal et al. | 367/98 |
| 7,221,118 B2 * | 5/2007 | Sasaki et al. | 318/282 |
| 7,324,894 B2 * | 1/2008 | Urman et al. | 701/124 |
| 8,510,990 B2 * | 8/2013 | Agam et al. | 49/28 |
| 2002/0036259 A1 * | 3/2002 | Agam et al. | 250/221 |
| 2005/0140319 A1 * | 6/2005 | Takashima | 318/286 |
| 2006/0162254 A1 * | 7/2006 | Imai et al. | 49/26 |
| 2006/0203615 A1 * | 9/2006 | Gal et al. | 367/98 |
| 2007/0271846 A1 * | 11/2007 | Miller et al. | 49/49 |
| 2007/0272019 A1 * | 11/2007 | Agam et al. | 73/628 |
| 2007/0274158 A1 * | 11/2007 | Agam et al. | 367/96 |
| 2010/0319256 A1 * | 12/2010 | Agam et al. | 49/31 |

* cited by examiner

ADAPTIVE ULTRASOUND DETECTING SYSTEM FOR A DOOR ASSEMBLY

CROSS REFERENCE TO RELATED APPLICATIONS

This is a continuation of International Application PCT/CA2011/001337, filed on Dec. 1, 2011, which claims the priority of U.S. Provisional Patent Application No. 61/419,436, filed on Dec. 3, 2010, the contents of each of which are incorporated by reference.

BACKGROUND

Systems and methods are known in the art to detect the presence of a person or object at the entrance of an automatic door such as an elevator door or a pedestrian sliding door. These systems usually include infrared (IR) and/or microwave detector above the door which registers the increase of frequency of the emitted beam returning to the detector as a person moves towards the entrance, and more generally sense the motion coming from the objects to be detected.

It is also known in the art to use such systems on both sides of a pivoting door for example so as to prevent the door from colliding a person arriving on one side thereof while the door is caused to open by another person on the other side.

Radar technologies have also been proposed as an alternative to microwave technologies in such systems.

However, systems and methods known in the art suffer from the following drawbacks:
- radar and passive IR technologies can only be used in application where the target to detect is moving;
- especially in the case of IR-based systems, the environment has to be controlled, such systems being sensitive to rain, dust and light conditions;
- IR sensors are also sensitive to the surroundings, thereby being prone to false alarms. They cannot operate when the door enters the line of sight of the detector, and cannot be active when the door is moving; and
- IR sensors, both active and passive, are not very accurate and therefore have to detect relatively long distance from the floor.

A typical solution in the art to this last specific problem, which is more common in elevator door applications, is to provide IR crossing beams in the door entrance. This however has the above-mentioned limitation of IR sensors, such as sensitivity to dirt, and also, since the resulted beams are very thin, they do not cover the whole opening. Furthermore, IR crossing beams are only applicable with sliding doors.

Ultrasound detecting systems for a door which are described in United States Patent Application Publ. No. US-2010-0319256-A1 titled "Presence Detector for a Door Assembly" and filed by Agam et al. on Aug. 23, 2010 aim at solving the above-described drawbacks.

Systems proposed by Agam et al. include a transducer assembly mounted to the door or to the door frame that emits ultrasound detecting beams towards the door entrance and triggers a detecting signal whenever a body intersects the detecting beams.

The same document discloses systems that cope for the movements of the door during operation. These adaptive systems suffer to some drawbacks. First, they do not allow determining the instant position of the door and are operable only with door assembly equipped with a further door position sensor. Second, the adaptive detection system described by Agam et al. are secured to the door and as thus, are movable in unison therewith. This limits the coverage zone of the system and renders the system less reliable.

An improved adaptive ultrasound system for a door assembly is therefore desired.

SUMMARY

Embodiments of an adaptive ultrasound detecting system include one or more sensor assemblies, emitting a plurality of ultrasound detecting beams in the vicinity of or towards the door entrance so as to create together a detecting zone adjacent the entrance of the door. The system adapts the detecting beams/detecting zone according to the position of the door relative to the detecting beams.

The adaptive quality of embodiments of such system is achieved i) by triggering on and off selected ultrasound sensors from the assembly; and/or by modifying ii) the shape and/or size and/or direction of selected beams and/or iii) the beam path between the transducers, depending on the relative position to the door of the sensors or of their beams. Furthermore according to some embodiments, the system can learn and recognize the door as it enter the beam, by its acoustic reflection pattern and/or the door position, and update the detecting zone accordingly.

According to embodiments of the present invention there is provided an adaptive ultrasound detecting system for a door assembly, the door assembly being for closing a door entrance and including a door movable along a path; the system comprising:

an ultrasound transducer assembly mounted to the door assembly adapted to emit at least one ultrasound detecting beam within the door path, to receive an echo indicative of a body located within the door path when the body intersects one of the at least one ultrasound detecting beam, and to trigger a detecting signal indicative of the body within the door path;

a controller coupled to the ultrasound transducer assembly adapted for receiving information indicative of a position of the door along the path, and for varying the emitting at least one detecting beam in accordance to the position of the door relative to the at least one detecting beam.

Other objects, advantages and features of the present invention will become more apparent upon reading the following non restrictive description of illustrated embodiments thereof, given by way of example only, with reference to the accompanying drawings.

BRIEF DESCRIPTION OF THE DRAWINGS

In the appended drawings:

FIGS. 2A-1 to 2A-8 are top plan schematic views of the door assembly with detecting system from FIG. 1, illustrating the variations in the coverage zone of the detecting system as the door opens;

FIGS. 2B-1 to 2B-6 are top plan schematic views of the door assembly with detecting system from FIG. 1, illustrating the variations in the coverage zone of the detecting system as the door closes;

DETAILED DESCRIPTION

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

The present invention concerns an ultrasound based detecting system mounted to a door, to a door frame or adjacent thereof, to detect a body such as a person, a vehicle, parcels in or in the vicinity of the entrance defined by the door.

It is to be noted that the expression "body" is to be construed herein and in the appended claims as including a person, an animal, a limb or part thereof and an object, such as, without limitation, a parcel and a bag capable of reflecting or blocking an ultrasound beam.

The expression "door assembly" is to be construed herein and in the appended claims as including a door or a plurality of doors mounted to a door frame or more generally a door or a plurality of doors assembled together so as to selectively close an entrance.

The expression "door" is to be construed herein and in the appended claims as including any panel made from any material and having any shape and sizes which removably blocks an entrance.

The expression "door frame" is to be construed herein and in the appended claims as including any structural elements used to operatively mount the door, including a wall, a floor, a ceiling, a combination thereof and any assembly of beams, or mechanical parts.

An adaptive ultrasound detecting system 10 for a door assembly according to a first illustrative embodiment will now be described with reference to FIGS. 1, 2A-1 to 2A-8, and 2B-1 to 2B-6 of the appended drawings.

Figure 1:
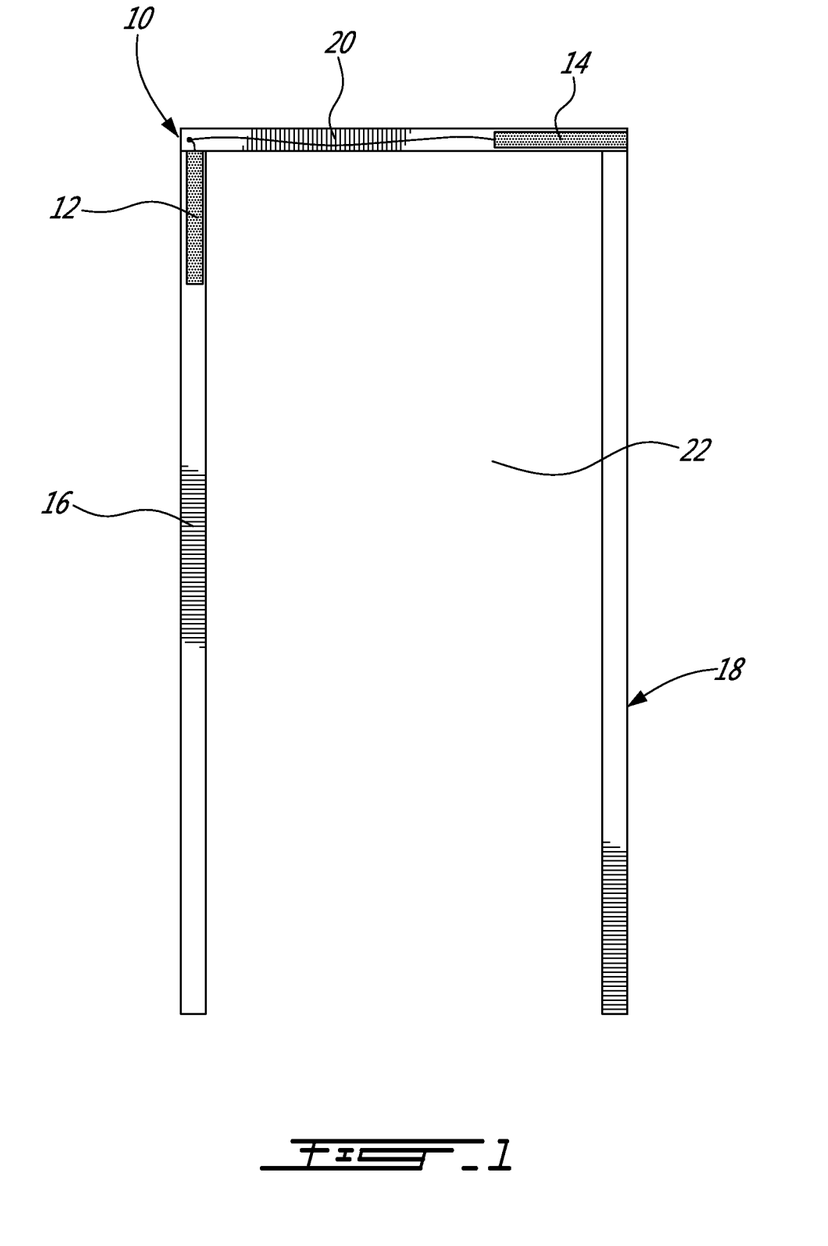
FIG. 1 is a front elevation of a door assembly having an adaptive ultrasound detecting system according to a first illustrative embodiment mounted thereto.

According to this first embodiment, the system 10 comprises ultrasound sensor arrays 12 and 14 mounted respectively to the top portion of the vertical door frame element 16 of the door frame 18 that support the hinge (not shown) and on the top frame element 20 thereof. The sensor arrays 12 and 14 are mounted in positions which allow reducing door obscuration. A door panel 22 is pivotally mounted to the vertical door frame element 16.

Each of the ultrasound arrays 12 and 14 includes a plurality of ultrasound transducers (not shown) operable both as emitters and receivers so as to emit ultrasound detecting cones 21-21' towards the entrance (see FIGS. 2A-1 to 2A-8 and 2B-1 to 2B-6) and as to detect when a body (not shown) enters or contacts one of said detecting cones 21-21'.

The system 10 further comprises or is coupled to a controller (not shown), a pulse generator (not shown) coupled to the controller and a sensor driver (not shown) coupled to the pulse generator. The transducers are coupled to the controller via the sensor driver. The controller, pulse generator, sensor driver, and transducers are connected to a power supply (not shown), in the form of a 12-24 DC (Direct Current) voltage source. Of course, the power supply may take other forms allowing energizing the detecting system 10. For example, the system can operate with an AC input wherein the maximum output to the transducer is limited by the transducer specification and/or the system's electrical circuitry.

The pulse generator includes an oscillating circuit and allows generating a pulsed signal having a frequency above the range of human hearing. This pulsed signal is amplified to the appropriate voltage and driven to the transducer by the sensor driver. Since the general operation of ultrasound transducers are believed to be well-known in the art, and for concision purposes, it will not be described furtherin in more detail.

In the following, the expression "controller" associated to the expression "transducer", or sensor or detector, should be construed as a device including a pulse generator and a sensor driver and more generally any means that causes an ultrasound transducer to operate.

Each ultrasound array 12 or 14 can be coupled to their own controller or they can be coupled to a same controller and/or amplifier and/or oscillator.

Figure 2A:
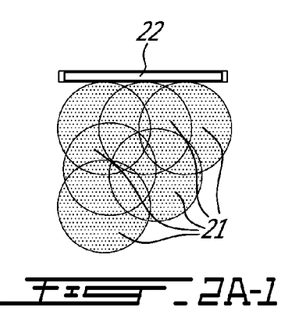
Figure 2A:
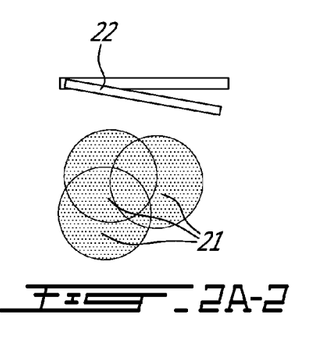
Figure 2A:
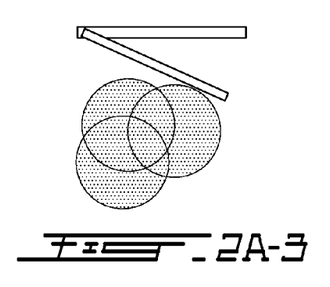
Figure 2A:
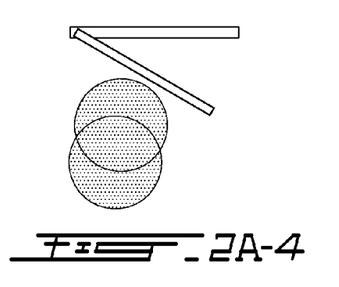
Figure 2A:
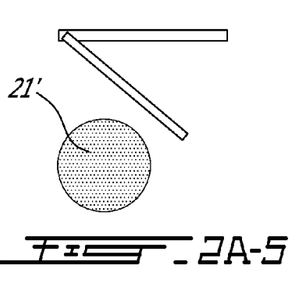
Figure 2A:
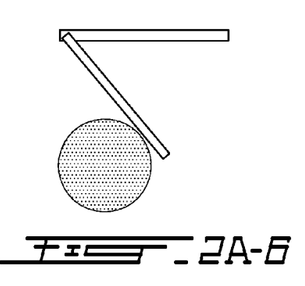
Figure 2A:
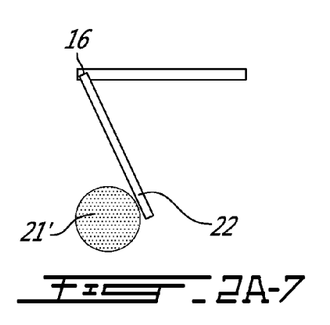

FIGS. 2A-1 illustrates the operation of the adaptive detecting system 10 when the door 22 opens. As can be seen from FIG. 2A-1, the controller initially triggers the ultrasound transducers from the arrays 12 and 14 so that they emit an ultrasound detecting cone 21 when the door 22 is closed. This creates a broad detecting zone in front of the entrance.

Then, as can be seen from the sequence of FIGS. 2A-2 to 2A-8, the controller gradually triggers less ultrasound transducers or modifies the transducers beam length (shown as a smaller circle 21' with 'foot print') yielding adaptive detecting cones, all on the side of the door panel 22 with respect to the entrance. According to a further embodiment (not shown), the controller continues triggering all transducers but is further configured to ignore echoes received from those detecting the door panel 22.

The controller of the transducers receives and uses information indicative of the position of the door 22 or uses the ultrasound transducers in determining such a position. According to this last specific embodiment, a calibration of the system 10 is performed before its operation so that the controller can learn to recognize the detection signature of the door 22.

With reference to FIGS. 2A-5 to 2A-8, the system 10 reaches a point, corresponding approximately to the door panel 22 being halfway being fully open, wherein a single detecting cone 21' remains and the diameter thereof is then gradually diminished or diminished by discrete step to adapt to the limited space remaining between the door panel 22 and the normal to the vertical frame element 16.

According to a further embodiment (not shown), another dimension of the detecting cone is modified (increased or diminished), such as for example is length or reach.

Since it is believed to be within the reach of a person skilled in the art to control an ultrasound transducer so as to modify its beam configuration, such a process will not be described herein in more detail for concision purposes.

Figure 2A:
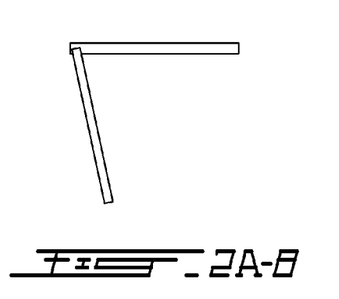
Figure 2B:
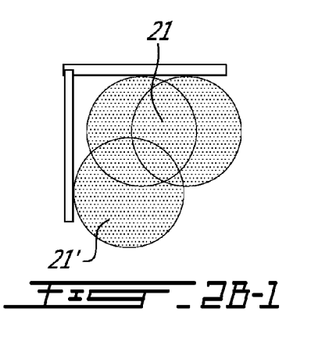
Figure 2B:
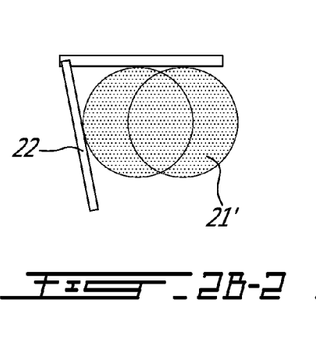
Figure 2B:
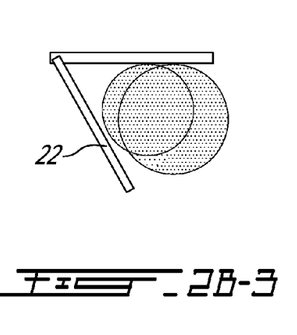
Figure 2B:
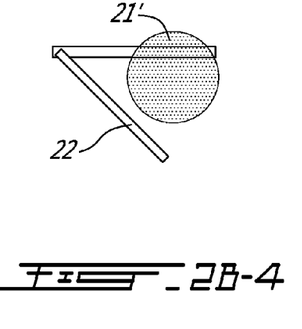
Figure 2B:
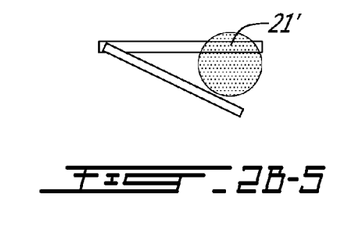
Figure 2B:
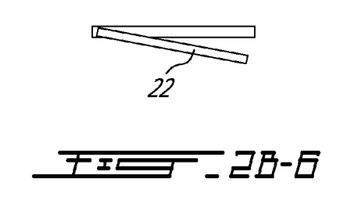

Beyond a predetermined angular position of the door panel 22 (see FIG. 2A-8), all transducers are turned off or their signal are ignored by the controller.

The transducers configuration and control thereof are adapted to the configuration and size of the door assembly and of the surrounding environment. For example, with reference to FIGS. 2A-1 to 2A-8, the detection zone defined by the active detecting cones 21 and 21' may be extended to the side of the door hinges opposite the entrance (on the left of the detecting zone defined by the detecting cones 21 in FIG. 2A-1) so as to protect a further body coming from that side of the door assembly.

Many combinations of detecting beam sizes and configurations and of their successive triggering on or off are allowed for a given door assembly and surrounding environment to achieve a desired protection.

Also, according to still another embodiment (not shown), the configuration and/or position of the ultrasound arrays differ than the one(s) illustrated in FIG. 1.

FIGS. 2B-1 to 2B-6 illustrate a closing cycle of the door 22 wherein, contrarily to the opening cycle illustrated in FIGS. 2A-1 to 2A-8, detecting cones created between the opened door panel 22 and the entrance are gradually turned off or have their size modified as the door 22 closes. Also, as can be seen from FIGS. 2B-3 to 2B-5, the dimension of the last detecting cone 21' further adapts to the position of the door panel 22.

The position of the door panel 22 is detected by an encoder or another device such as a magnet, an accelerometer or an electronic gyro system (not shown). As mentioned hereinabove, the position of the door 22 can additionally or alternatively be detected by the system 10. A calibration step is then performed prior to the operation of the system 10 to allow the controller recognizing the door position and/or the signature of the door panel 22 while the door 22 pivots.

According to the first illustrative embodiment, the ultrasound transducers from the arrays 12 and 14 alternate between emitting and detecting ultrasound. The controller is configured for collecting the signals from the sensor arrays 12 and 14 and for acting accordingly should said signals be indicative of the presence of a body. The controller then triggers an alarm signal, and/or sends a signal to the door controller that causes the door to slow, to stop or to reverse its current movement.

Even though the system according to the first illustrative embodiment has been illustrated implemented on only one side of the door entrance, it can be duplicated on both side of the door. According to other embodiments (not shown), the location of the sensor arrays 12 and 14 are different, depending on the coverage/protection required.

Also, the system is not limited to include transducers acting as both emitters and receivers. According to a further embodiment (not shown), pairs of ultrasound emitters and receivers are used.

Figure 3A:
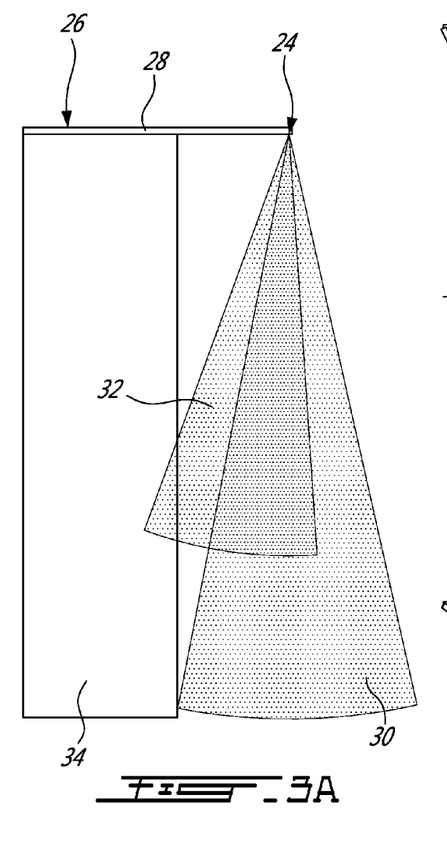
FIG. 3A is a front elevation schematic view of a door assembly having an adaptive ultrasound detecting system according to a second illustrative embodiment mounted thereto.
Figure 3B:
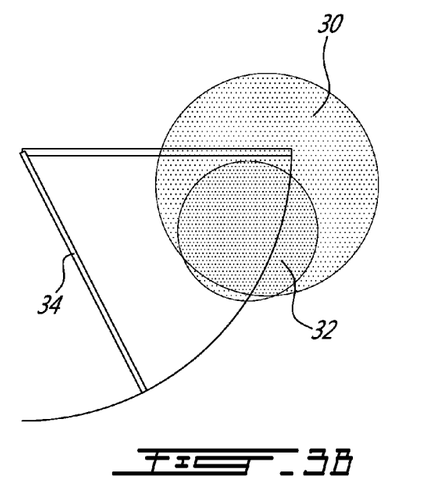
FIGS. 3B and 3C are top plan schematic views of the door assembly with detecting system from FIG. 3A, illustrating the operation of the detecting system as the door pivots, and more specifically the shortening of the detecting zone to compensate for the door position.
Figure 3C:
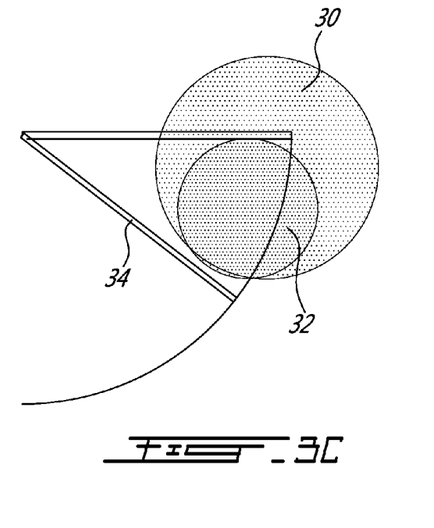

An adaptive ultrasound detecting system 24 for a door assembly 25 according to a second illustrative embodiment will now be described with reference to FIGS. 3A-3C. Since the system 24 shares some similarities with the system 10, only differences between the two systems 24 and 10 will be described herein for concision purposes.

The door assembly 26 is similar to the door assembly illustrated in FIG. 1 and includes a door frame 28 having a top horizontal frame element 26 and a door 34 pivotally mounted to the door frame 26.

The system 24 includes a sensor assembly (not shown) mounted to top horizontal frame element 26 at the distal end thereof so as to create two detecting cones 30 and 32.

The system 24 is configured so that the detecting cone 30 is wider than the cone 32 and remains active for detection whenever the door 34 is open. The second detecting cone 32 is smaller than the first detecting cone 30, it is slanted towards the door 34 and its range gradually shortens as the door 34 moves from a completely opened position to a closed position, i.e. as the door approaches the sensor assembly. The rate that the reach shortens is such that the door 34 does not enter the cone 32.

Generating a detecting cone in the entrance that is slanted towards the door 34 and that has a reach which gradually shortens as the door closes allows the system 24 to detect bodies longer while preventing any interference from the door. The system is configured so that the detecting cone 30 is removed or modified using an adaptive threshold method as described herein before its penetration by the door 34 as described with reference to the first illustrative embodiment of the system. The position of the door 34 is provided to the system 24 as described hereinabove with reference to the first illustrative embodiment.

According to a further embodiment (not shown), the system 24 generates only the variable size detecting cone 32.

FIGS. 4A to 4D illustrate an adaptive ultrasound detecting system according to a third illustrative embodiment. Since the system according to the third illustrative embodiment shares some similarities with the system 10, only differences between these two systems will be described herein for concision purposes.

The detecting system according to this third illustrative embodiment is mounted to a sliding door assembly 35 such as used for example in an elevator, train, and in other applications. The sliding door assembly 35 includes a door frame 36 and one or more motorized door panels 38 slidably mounted to the frame 36 within a same plane. The door assembly 35 defines an entrance 37.

More specifically, FIGS. 4A to 4D illustrate a sequence in the operation of the adaptive detecting system when the sliding door panels 38 close. The system comprises ultrasound transducers (not shown) mounted to the sliding door frame 36 to produce a plurality of acoustic cones 40 aimed towards the ground and therefore perpendicularly to the directions of displacement of the panels 38. The acoustic cones 40 are aligned and positioned so as to form a virtual detecting volume between the side door frames 36.

Figure 4A:
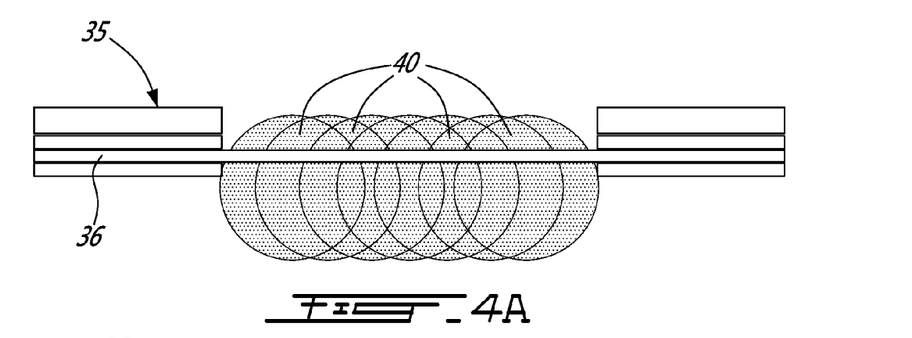
FIGS. 4A-4D are top plan schematic views of a sliding door assembly having an adaptive ultrasound detecting system according to a third illustrative embodiment mounted thereto, illustrating the graduate deactivation of sensors as the doors close.
Figure 4B:
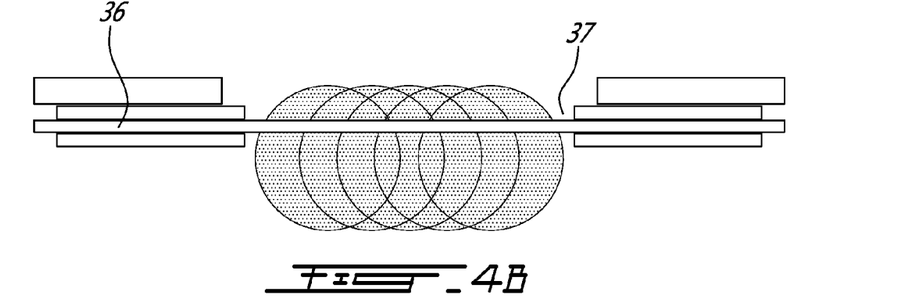
Figure 4C:
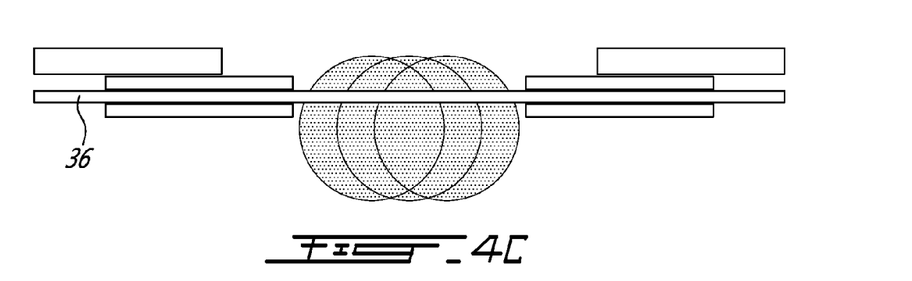
Figure 4D:
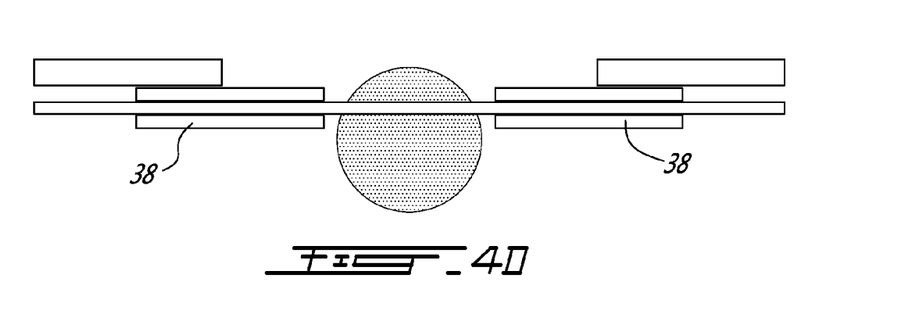

As illustrated from FIGS. 4B to 4C, the adaptive detecting system according to the third embodiment is configured to change the configuration and coverage of the detecting volume depending on the position of the doors 38.

As described with reference to the system 10, the controller of the system according to the third illustrative embodiment receives information indicative of the position of the doors 38 and uses this information to trigger on/off selected ultrasound transducers in order to yield an acoustic detecting zone defined by the ultrasound beams 40 only between the two doors 38.

According to a further embodiment, the transducers are operated so as to additionally or alternatively modify their detection range.

Similarly to the system 10, the controller of the system according to the third embodiment may alternatively be configured to wait until it recognizes the signature of the doors 38, in the form of echoes resulting from the reflection of the ultrasound detecting beams onto the doors 38, to subtract such signature from the detected echoes and/or to trigger off the corresponding transducers. The controller further takes into account that the specific signature of each door 38 can be different for each transducer depending on the door position.

As it has been described with reference to the first embodiment, the controller of the system obtains the position of the door panels 38 either by being coupled to the door controller, to an encoder operatively coupled to the door (both not shown) or by detecting the door panel specific pattern as the door panels 38 move. The acoustic reflection pattern of the door panels 38 relative to the door position can be detected by the controller at installation, or, for example, at any time during an initiation or a calibration step.

An adaptive ultrasound detecting system for a door assembly according to a fourth embodiment will now be described with reference to FIGS. 5A to 5G. Since the system according to the fourth illustrative embodiment is similar to the system according to third illustrative embodiment, only the difference between these two systems will be described herein for concision purposes.

FIGS. 5A to 5G illustrate an adaptive detecting system including ultrasound sensors that remain active before and also when the door panels 38 enter their field of view (FOV). The system takes into account the door reflection patterns for predetermined door panel positions for each transducer whose detection area has been penetrated. This allows modifying the detected pattern, for example in an adaptive threshold method as described hereinbelow with reference to FIGS. 7 and 8. This allows preventing false alarms. The door positions are either provided to the system controller or determined from the door reflection patterns.

The sequence of operation of the detecting system while the sliding doors 38 open is shown in FIGS. 5A to 5F. As can be seen from these Figures, once the door panels are out of a detecting cone, the correspond transducer are turned off to reduce false alarm and energy consumption. According to another embodiment, the transducers remain active at all time.

Figure 5A:
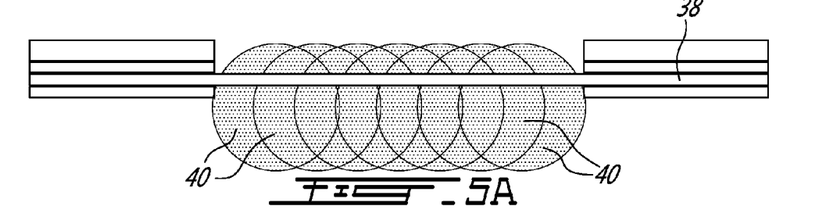
FIGS. 5A-5F are top plan schematic views of a door assembly having an adaptive ultrasound detecting system according to a fourth illustrative embodiment mounted thereto, illustrating the graduate deactivation of sensors as the doors close.

In FIG. 5A, the door panels are opened and all ultrasound transducers are triggered so that all the detecting beams 40 are active.

Figure 5B:
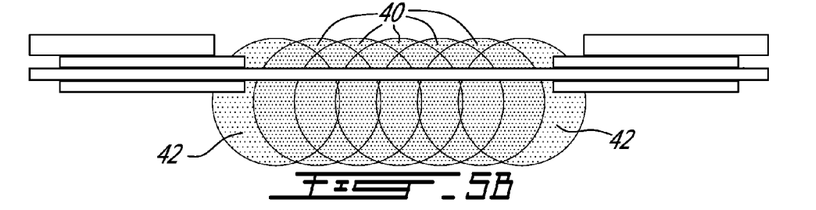
Figure 5C:
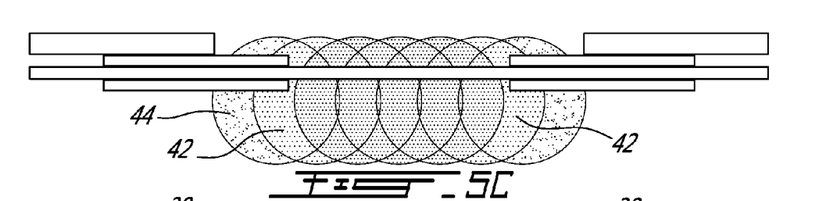

FIG. 5B shows the door panels 38 entering the two ultrasound beams 42 that are located at the opposite longitudinal ends of the zone of coverage. The controller then continues to cause these two beams 42 to remain active but the threshold pattern is modified in consideration of the detected reflections of the door panels 38. As described hereinabove, the controller is programmed with the door reflection pattern, as obtained for example during a system calibration process.

The other detecting cones 40 are considered by the controller to be fully operational, and reflected echoes detected therein are automatically considered targets without further discrimination. According to another embodiment, a discrimination process related to noise and/or other environmental effect on detected echoes is applied thereon.

Figure 5D:
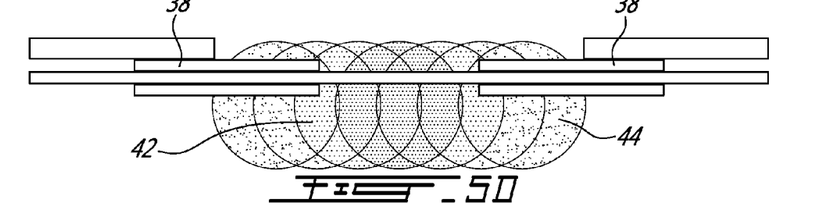
Figure 5E:
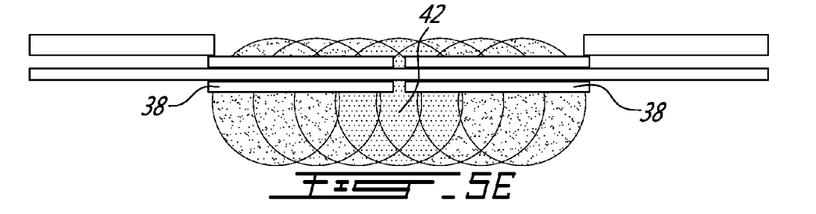
Figure 5F:
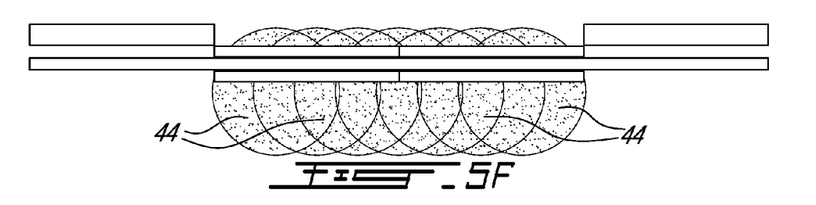
Figure 5G:
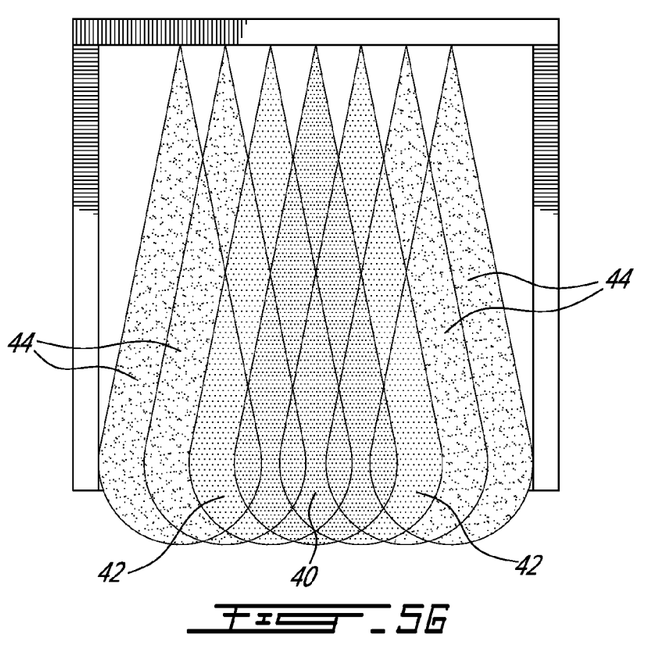
FIG. 5G is a front elevation schematic view of the door assembly with detecting system from FIG. 5A to 5F, and more specifically corresponding to the configuration shown in FIG. 5C.

As shown for example in FIG. 5D, any ultrasound transducer that generates a detecting cone 44 which is passed completely or substantially by a door panel, depending on the selected criteria, will be treated either as a) inoperational or b) operational while ignoring or taking into account any door specific reflection pattern.

According to a further embodiment, the sensors are operational at all time and the received echoes are treated to remove the door panel signature as the door panels 38 pass within their field of view.

Even though the ultrasound door entrance detecting system according to the present invention has been described with reference to illustrative embodiments wherein the transducers are mounted directly to the door frame, a person skilled in the art will appreciate that the transducers can also be mounted to the door or to another structure adjacent the door entrance.

An adaptive ultrasound detecting system 46 for a door assembly according to a fifth illustrative embodiment will now be described with reference to FIGS. 6A and 6B. Since the system 46 is similar to the system 10, only the difference between the two systems 46 and 10 will further be described for concision purposes.

The system 46 includes a plurality of ultrasound transducers 48 to 58 mounted to the swing door panel 22 therein at a height from the bottom edge of the door 47 corresponding to the average height of the waist of a person.

According to the fifth illustrative embodiment, the door panel 47 is pivotally mounted to a wall 60 that is perpendicular to the entrance 62.

Each of the ultrasound transducers 48 to 58 selectively act as an ultrasound emitter and/or receiver. The role of the transducers 48 to 58 are changed by the controller to emitter, receiver or to alternatively both depending on the door size, door position and on the door environment, including for example the position of the door 47 with regards to a rail. The length of the resulting detecting cones is also modified depending on anyone or all of the same criteria.

Figure 6A:
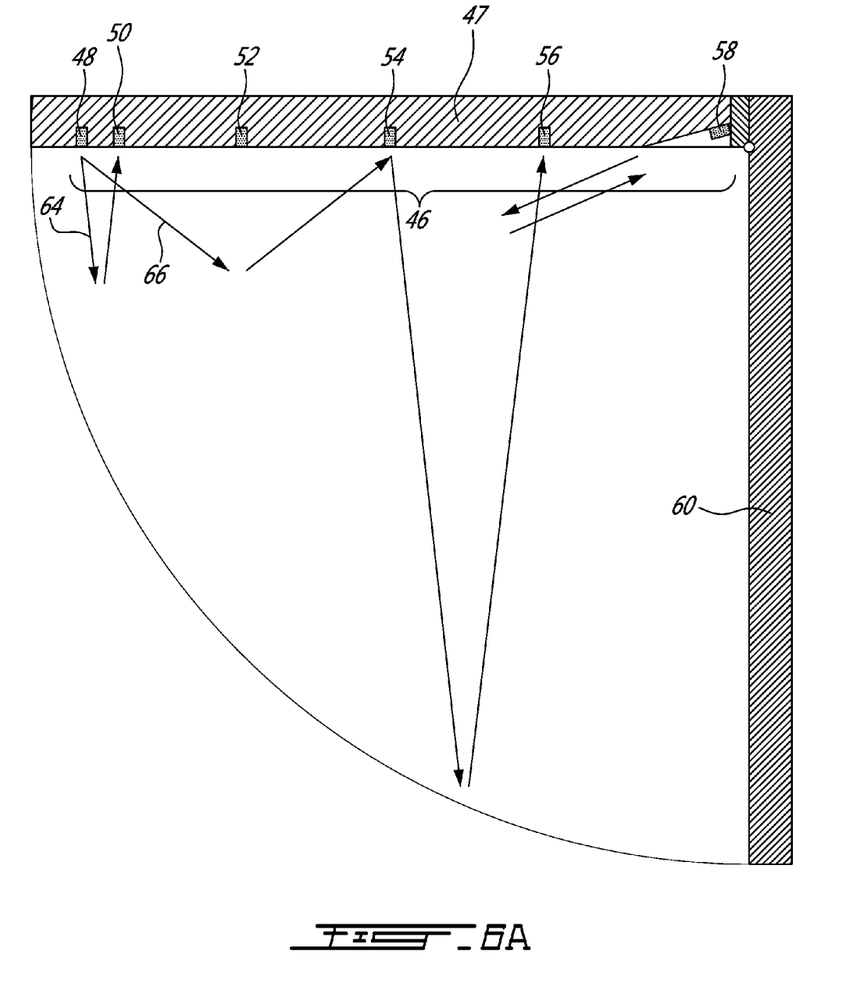
FIGS. 6A and 6B are bottom plan schematic partly sectional views of a door assembly having an adaptive ultrasound detecting system according to a fifth illustrative embodiment mounted thereto, illustrating the change in the configuration of the ultrasound detecting beams as the door opens in reference to a virtual or actual wall; the beam pattern depending on the door position, wherein the transducers can receive signals from itself or from other transducer.
Figure 6B:
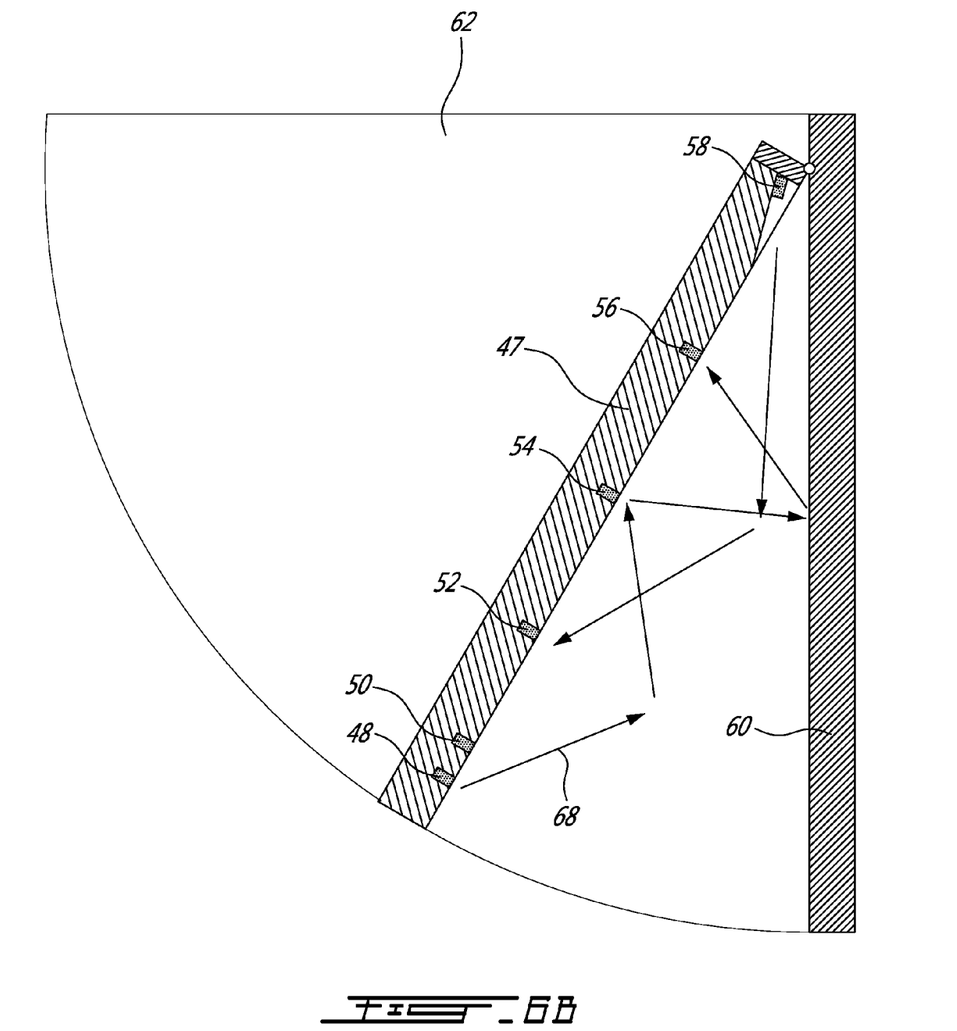

As can be seen in comparing FIGS. 6A and 6B, transducers 48 emits detecting beams (see arrow 64 and 66) to be detected respectively by the transducers 50 and 54 when the door 47 is closed (see FIG. 6A) and emits a longer detecting beam 68 to be detected by the transducer 54 only when the door 47 is partially open.

As another example, the transducer 58, which is mounted to the door panel 47 so as to define a none-orthogonal angle therewith (contrarily to the other transducers), acts as both an emitter and a receiver when the door 47 is closed, and only as an emitter when the door 47 is partially opened.

Comparing the arrows in FIGS. 6A and 6B, which represent the direction of ultrasound emitting and receiving beams, one can see that the zone of coverage changes as the door panel 47 moves. This is allowed by modifying the ultrasound emitting and receiving beam configuration, including their range.

The system 46 allows improving the detection speed and the coverage zone as the door moves.

According to another embodiment (now shown), the series of detector is positioned at another height than at waist level. Also, according to still another embodiment (not shown), the ultrasound transducers are not aligned.

Embodiments of an adaptive detecting system is not limited to a door assembly and can be adapted to detect the presence of a body near other swinging, sliding, pivoting or more generally moving object. For concision purposes, the expression "door assembly" will however be used for all occurrences in the following description and claims.

Figure 7:
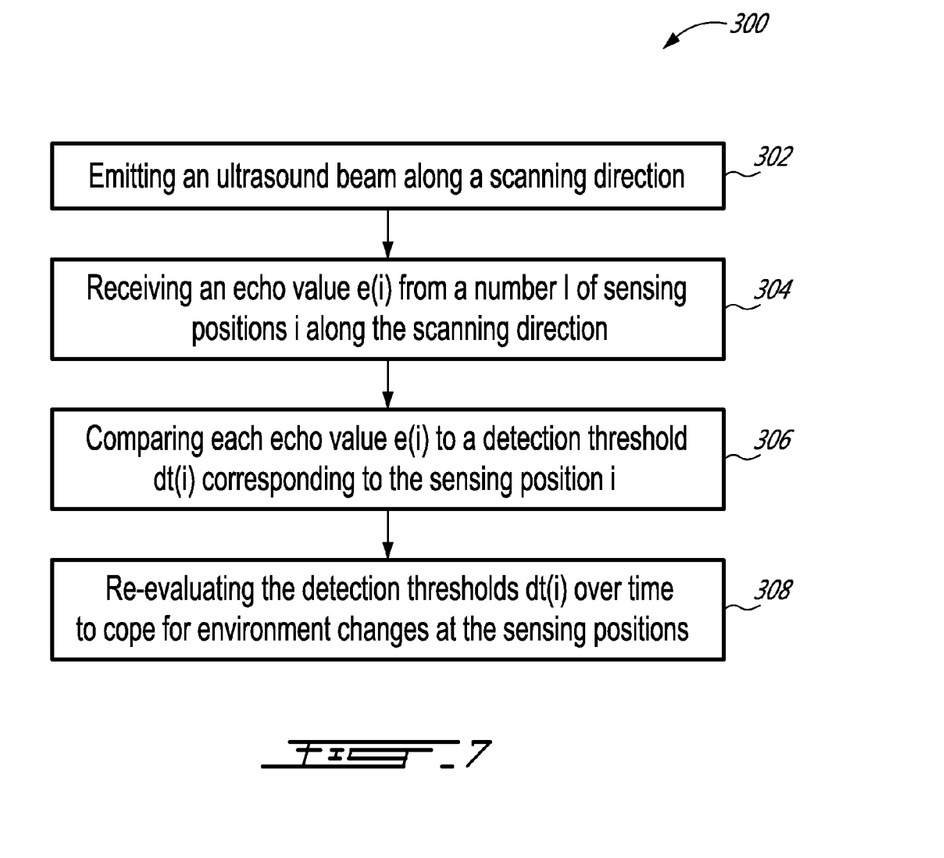
FIG. 7 is a flowchart of an adaptive ultrasound detecting method according to an embodiment of a further aspect of the present invention.
Figure 8:
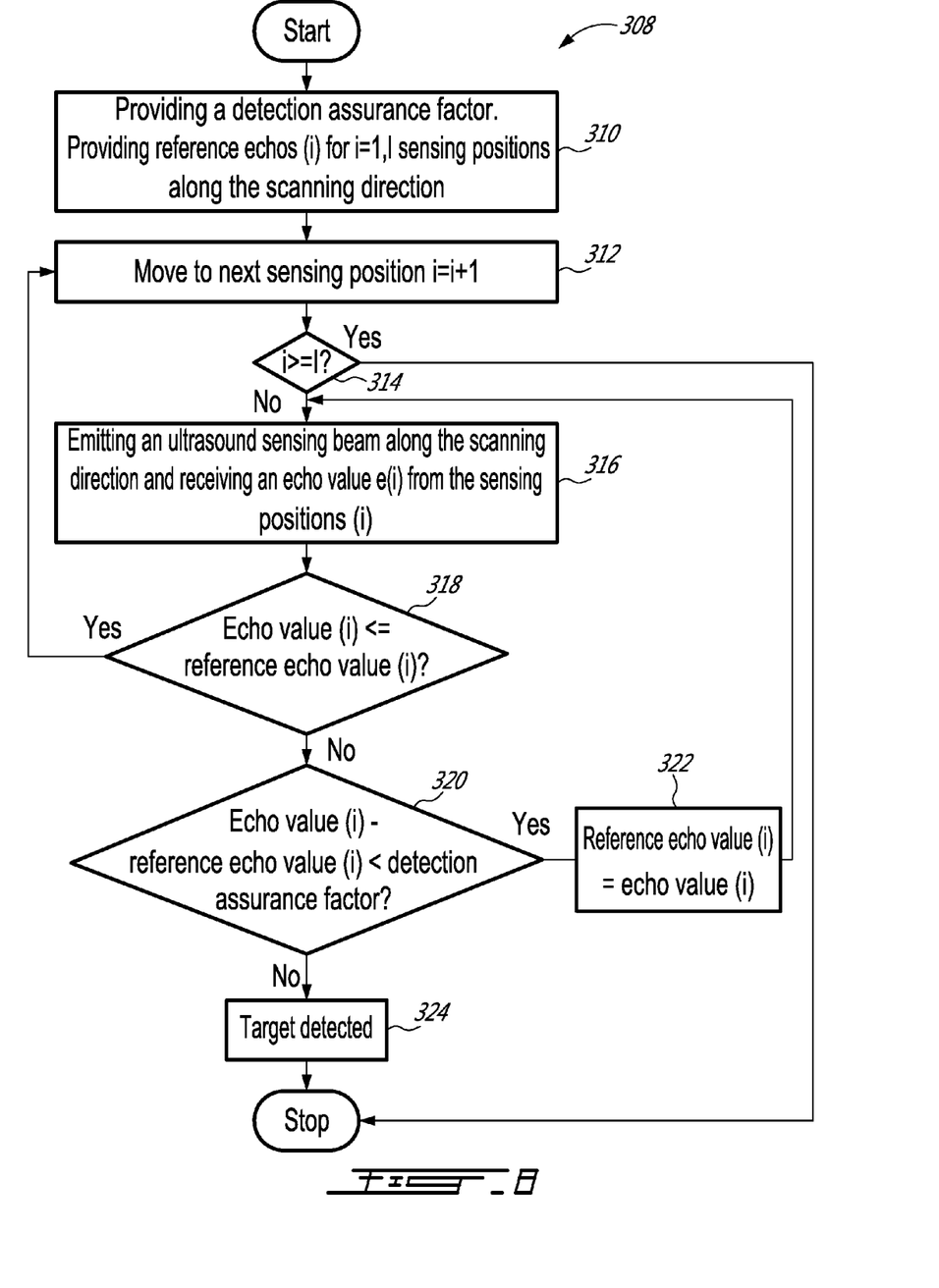
FIG. 8 is a flowchart of the ultrasound detecting method threshold builder from FIG. 7.

It is to be noted that many other modifications could be made to the embodiments of an adaptive ultrasound detecting system for a door assembly as described hereinabove. For example:

- the number of ultrasound transducers and/or sensor assemblies may vary depending on the door assembly configuration and on the protection requirement;
- the detecting beams are not limited to being cone-shaped;
- adjacent detecting beams can be distanced from one another so that the resulting detecting beams are partially superimposed or so as to yield gaps therebetween;
- even though the above embodiments of an adaptive ultrasound detection system have been described being mounted to door assemblies which include rectangular door panels, they can be mounted to door assembly having other configuration and using any suitable mounting elements or assemblies;
- an adaptive ultrasound detecting system according to an embodiment of the present invention is not limited to sliding doors and can be used on other types of doors such as swing doors, revolving doors, befouled doors, etc.;
- embodiments of adaptive ultrasound detecting system may be mounted to a door assembly including only one or a plurality of doors pivotally or slidably mounted to the floor or ceiling or to any other structure using for example a pivot assembly or a track;
- some of the ultrasound transducers can be mounted to the door frame, the other of the ultrasound transducer being mounted to the door;
- an adaptive threshold technology can further be used, such as the one described in U.S. Pat. No. 7,130,244 B2 issued on Oct. 31, 2006 to Gal et al., that allows adapting the detection to changes in the detecting system environment (FIGS. 7 and 8 summarize such a method) or an adaptive dead zone technology that modifies the dead zones based on the door position, such as the one described in the U.S. Pat. No. 6,344,642 issued on Feb. 5, 2002 to Agam et al. The entire content of both references above is herein incorporated by reference. Such an adaptive method can be used for all active detecting beams, or selectively for those penetrated by the door. In this last case, as the door moves, the detected pattern changes and the adaptive threshold pattern changes accordingly. The adaptive threshold method is therefore dynamic, as the threshold is adapted in accordance to the position of the door(s). This allows the system for example to function without a door position sensor whereby the door reflection at each door position for each transducer is relearned as the door moves.
- a windowing technique can be used to eliminate reflections coming from the resulting wide beam. A time window algorithm can also be implemented in the detector controller for example so as to reduce false alarm rate (FAR). According to this method, the signal analysis performed by the detector controller on the received echoes is limited to one or more predetermined spatial regions where a body is more prone to collide with the door, whereby any surrounded noises will be ignored, even though they can be detected by the detector.

Since windowing techniques are believed to be well-known in the art, they will not be described herein in more detail for concision purposes.

The above-described adaptive ultrasound detecting systems for a door assembly can be adapted for both automatic and non-automatic doors assemblies.

Although the present invention has been described hereinabove by way of illustrated embodiments thereof, it can be modified, without departing from the spirit and nature of the subject invention as defined in the appended claims.

The invention claimed is:

1. An adaptive ultrasound detecting system for a door assembly, the door assembly being for closing a door entrance and including a door movable along a path; the system comprising:
    an ultrasound transducer assembly including a plurality of ultrasound transducers mounted to the door assembly adapted to emit at least one ultrasound detecting beam within the door path, to receive an echo indicative of a body located within the door path when the body intersects one of the at least one ultrasound detecting beam, and to trigger a detecting signal indicative of the body within the door path;
    a controller coupled to the ultrasound transducer assembly adapted for receiving information indicative of a position of the door along the path, and for varying the emission of at least one ultrasound detecting beam in accordance to the position of the door relative to the at least one detecting beam;
    wherein varying the emission of at least one ultrasound detecting beam includes temporarily triggering off at least one of the plurality of ultrasound transducers;
    wherein temporarily triggering off at least one of the plurality of ultrasound transducers includes sequentially triggering off each of the at least one of the plurality of ultrasound transducers before the door penetrates the corresponding one of the at least one ultrasound detecting beam.

2. An adaptive ultrasound detecting system as recited in claim 1, wherein at least one of the plurality of ultrasound transducers acts as both an ultrasound emitter and receiver.

3. An adaptive ultrasound detecting system as recited in claim 1, wherein at least one of the plurality of ultrasound transducers acts as an ultrasound emitter and at least another one of the plurality of ultrasound transducers act as an ultrasound receiver.

4. An adaptive ultrasound detecting system as recited in claim 1, wherein the door assembly includes a door frame and the door; at least one of the plurality of ultrasound transducers being mounted to the frame and at least another one of the plurality of ultrasound transducers being mounted to the door.

5. An adaptive ultrasound detecting system as recited in claim 1, wherein varying the emitting at least one detecting beam includes modifying the role of at least one of the ultrasound transducers to one of an ultrasound emitter, an ultrasound receiver and to alternating between being an ultrasound emitter and receiver.

6. An adaptive ultrasound detecting system as recited in claim 1, wherein each of the at least one ultrasound detecting beam has a path defined by at least one of the plurality of ultrasound transducers; varying the emission of at least one ultrasound detecting beam includes modifying at least one of the path.

7. An adaptive ultrasound detecting system as recited in claim 1, wherein varying the emission of at least one ultrasound detecting beam includes modifying at least one dimension of the detecting beam.

8. An adaptive ultrasound detecting system as recited in claim 7, wherein the at least one dimension of the detecting beam is a length or a diameter thereof.

9. An adaptive ultrasound detecting system as recited in claim 1, wherein the information indicative of a position of the door is obtained from a device including at least one of an encoder, an accelerometer, a magnet, and an electronic gyro.

10. An adaptive ultrasound detecting system as recited in claim 1, wherein the information indicative of a position of the door results from a detection by the ultrasound transducer assembly.

11. An adaptive ultrasound detecting system as recited in claim 1, wherein the at least one ultrasound detecting beam is slanted towards the door.

12. An adaptive ultrasound detecting system as recited in claim 11, wherein varying the emitting at least one detecting beam includes modifying a length of thereof.

13. An adaptive ultrasound detecting system as recited in claim 1, wherein the at least one ultrasound detecting beam is cone shaped.

14. An adaptive ultrasound detecting system as recited in claim 1, wherein the ultrasound transducer assembly is adapted to emit at least two ultrasound detecting beam, one on each side of the entrance.

15. An adaptive ultrasound detecting system as recited in claim 1, wherein the door assembly is selected from the group consisting of a pivoting door, a sliding door, and a swing door.

16. An adaptive ultrasound detecting system as recited in claim 1, wherein the door assembly includes a door which is automatically movable along the path.

17. An adaptive ultrasound detecting system as recited in claim 1, wherein the controller is further adapted to implement at least one of a dynamic adaptive threshold technique and a windowing technique.

18. An adaptive ultrasound detecting system for a door assembly, the door assembly being for closing a door entrance and including a door movable along a path; the system comprising:
an ultrasound transducer assembly including a plurality of ultrasound transducers mounted to the door assembly, adapted i) for an emission of at least one ultrasound detecting beam within the door path, ii) to receive an echo indicative of a body located within the door path when the body intersects one of the at least one ultrasound detecting beam, and iii) to trigger a detecting signal indicative of the body within the door path;
a controller coupled to the ultrasound transducer assembly adapted for receiving information indicative of a position of the door along the path for varying the emission of at least one ultrasound detecting beam in accordance to the position of the door relative to the at least one detecting beam, for recognising a signature of the door and for removing the signature of the door from each received echo from one of the plurality of ultrasound detecting beam that is at least partially penetrated by the door;
wherein varying the emission of at least one ultrasound detecting beam further includes triggering of each of the plurality of ultrasound transducers that produces a detecting beam that has been penetrated by the door after the detecting beam is completely passed by the door.

* * * * *